(12) United States Patent
Takahashi et al.

(10) Patent No.: US 8,141,391 B2
(45) Date of Patent: Mar. 27, 2012

(54) GLASS PREFORM MANUFACTURING METHOD

(75) Inventors: Kenichi Takahashi, Chiyoda-ku (JP); Youko Yamanashi, Chiyoda-ku (JP)

(73) Assignee: Furukawa Electric Co., Ltd., Tokyo (JP)

( * ) Notice: Subject to any disclaimer, the term of this patent is extended or adjusted under 35 U.S.C. 154(b) by 0 days.

(21) Appl. No.: 12/856,261

(22) Filed: Aug. 13, 2010

(65) Prior Publication Data

US 2010/0300151 A1 Dec. 2, 2010

Related U.S. Application Data

(63) Continuation of application No. PCT/JP2009/057065, filed on Apr. 6, 2009.

(30) Foreign Application Priority Data

Apr. 8, 2008 (JP) .................................. 2008-100332

(51) Int. Cl.
*C03B 37/014* (2006.01)
*C03C 23/00* (2006.01)

(52) U.S. Cl. ............... 65/390; 65/399; 65/30.1; 65/426; 65/427

(58) Field of Classification Search .................... 65/390, 65/399

See application file for complete search history.

(56) References Cited

U.S. PATENT DOCUMENTS

| 3,859,073 A | | 1/1975 | Schultz |
| 4,110,093 A | * | 8/1978 | Macedo et al. ................. 65/399 |
| 4,225,330 A | * | 9/1980 | Kakuzen et al. ................ 65/426 |
| 4,302,231 A | | 11/1981 | Macedo et al. |
| 5,930,436 A | | 7/1999 | Okamura et al. |

FOREIGN PATENT DOCUMENTS

| JP | 55-136141 | 10/1980 |
| JP | 56-3980 | 1/1983 |
| JP | 7-109144 | 4/1995 |
| JP | 2003-204097 | 7/2003 |
| JP | 2004-231473 | 8/2004 |

* cited by examiner

*Primary Examiner* — Matthew Daniels
*Assistant Examiner* — Lisa Herring
(74) *Attorney, Agent, or Firm* — Oblon, Spivak, McClelland, Maier & Neustadt, L.L.P.

(57) ABSTRACT

A glass preform manufacturing method includes: generating glass fine particles by hydrolyzing a source gas in an oxyhydrogen flame; depositing the generated glass fine particles to form a torous glass preform; immersing the porous glass preform in an additive solution including an additive solvent in which a compound containing a desired additive is dissolved to impregnate the additive solution into the porous glass preform; first replacing of replacing the additive solvent remaining in the porous glass preform with the replacement solvent by immersing the porous glass preform in which the additive solution remains in a replacement solvent in which a solubility of the additive is lower than that in the additive solvent and having miscibility with the additive solvent; drying the porous glass preform after the first replacing; and sintering the dried porous glass preform to transparently vitrify the dried porous glass preform.

5 Claims, 3 Drawing Sheets

- POROUS-GLASS-PREFORM FORMING PROCESS — S101
- IMPREGNATING PROCESS — S102
- FIRST SOLVENT REPLACING PROCESS — S103
- SECOND SOLVENT REPLACING PROCESS — S104
- DRYING PROCESS — S105
- SINTERING PROCESS — S106

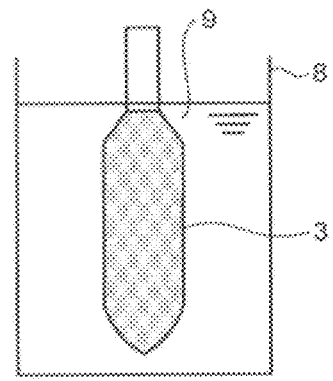
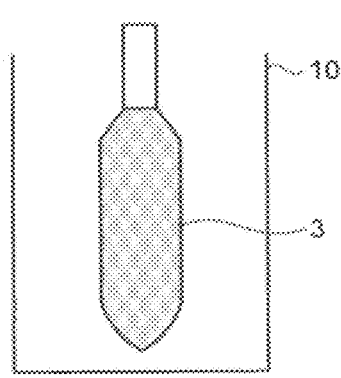
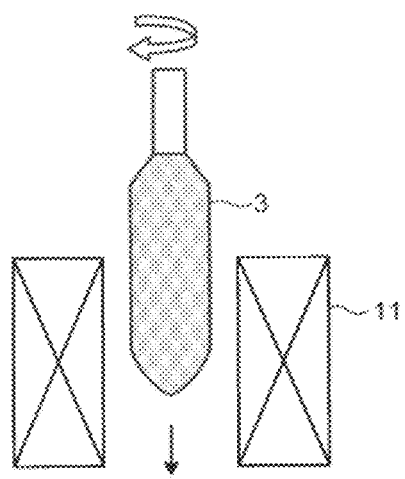
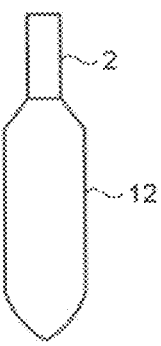
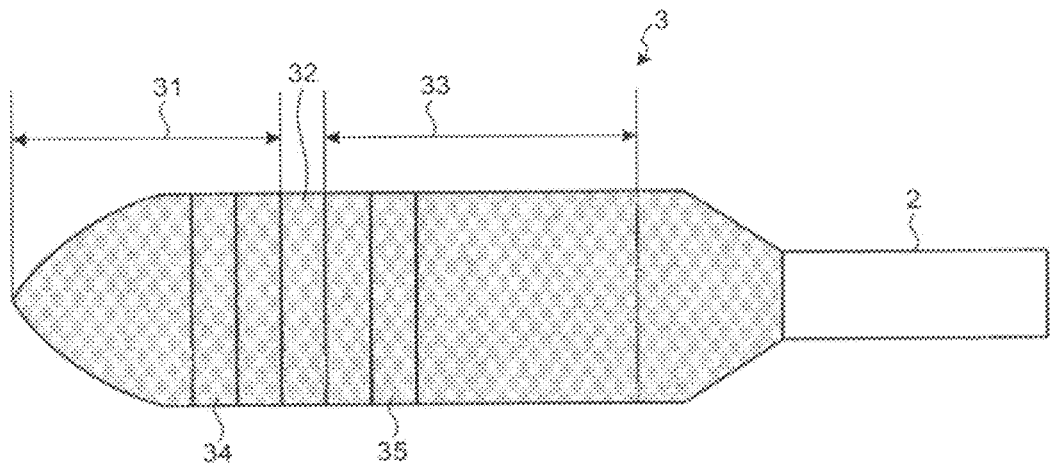

|  | CENTER | INTERMEDIATE | OUTER PERIPHERY |
|---|---|---|---|
| WET SPECIMEN | 2.0 | 2.8 | 4.2 |
| COMPARATIVE EXAMPLE 1 | 0.38 | 0.50 | 7.7 |
| EXAMPLE 1 | 0.96 | 1.9 | 2.0 |

GLASS PREFORM MANUFACTURING METHOD

CROSS-REFERENCE TO RELATED APPLICATIONS

This application is a continuation of PCT International Application No. PCT/JP2009/057065 filed on Apr. 6, 2009 which claims the benefit of priority from Japanese Patent Application No. 2008-100332 filed on Apr. 8, 2008, the entire contents of which are incorporated herein by reference.

BACKGROUND OF THE INVENTION

1. Field of the Invention

The present invention relates to a method of manufacturing a glass preform added with an additive.

2. Description of the Related Art

Conventionally, glass preforms added with additives, which are used as optical fiber preforms and the like, are manufactured as follows. First, a porous glass preform is formed by a vapor-phase synthesis method such as vapor-phase axial deposition (VAD) method or outside vapor deposition (OVD) method. The porous glass preform formed is immersed in an additive solution with an additive-containing compound dissolved in a predetermined solvent to impregnate the additive solution into fine pores in the porous glass preform. Next, the porous glass preform is dried to evaporate the solvent and to make the additive remain in the pores. Lastly, the porous glass preform is sintered to be transparently vitrified and formed into a glass preform (see Japanese Patent Publication No. S58-003980).

Further, a method of adding a rare earth element in high Concentration in a center portion of a glass preform in manufacturing an optical fiber preform doped with the rare earth element to manufacture, for example, an optical-amplification optical fiber has been disclosed (see Japanese Patent Application Laid-open No. H7-109144).

In recent years, along with an increasing demand for high-performance like suppression of nonlinear phenomena in optical fibers and for reduction in cost, a demand for addition of a larger quantity of an additive in the optical fibers is increasing. However, conventionally, increasing the additive concentration in the additive solution has been the only way to increase the quantity of addition, and it has been difficult to efficiently add the additive.

SUMMARY OF THE INVENTION

It is an object of the present invention to at least partially solve the problems in the conventional technology.

According to an aspect of the present invention, a glass preform manufacturing method includes: generating glass fine particles by hydrolyzing a source gas in an oxyhydrogen flame; depositing the generated glass fine particles to form a porous glass preform; immersing the porous glass preform in an additive solution including an additive solvent in which a compound containing a desired additive is dissolved to impregnate the additive solution into the porous glass preform; first replacing of replacing the additive solvent remaining in the porous glass preform with the replacement solvent by immersing the porous glass preform in which the additive solution remains in a replacement solvent in which a solubility of the additive is lower than that in the additive solvent and having miscibility with the additive solvent; drying the porous glass preform after the first replacing; and sintering the dried porous glass preform to transparently vitrify the dried porous glass preform.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 5 is a schematic diagram for explaining a second solvent replacing process;

FIG. 6 is a schematic diagram for explaining a drying process;

FIG. 7 is a schematic diagram for explaining a sintering process;

FIG. 8 is a schematic diagram of a manufactured optical fiber preform;

FIG. 9 is a schematic diagram for explaining a method of manufacturing specimens of Example 1 and Comparative Example 1;

DETAILED DESCRIPTION OF THE PREFERRED EMBODIMENTS

Exemplary embodiments of an optical fiber preform manufacturing method according to the present invention will be explained below in detail with reference to the accompanying drawings. In the following, an embodiment in which an additive, erbium (Er), which is a rare earth metal element, is added is explained, but the present invention is not limited to the embodiment.

Figure 1:
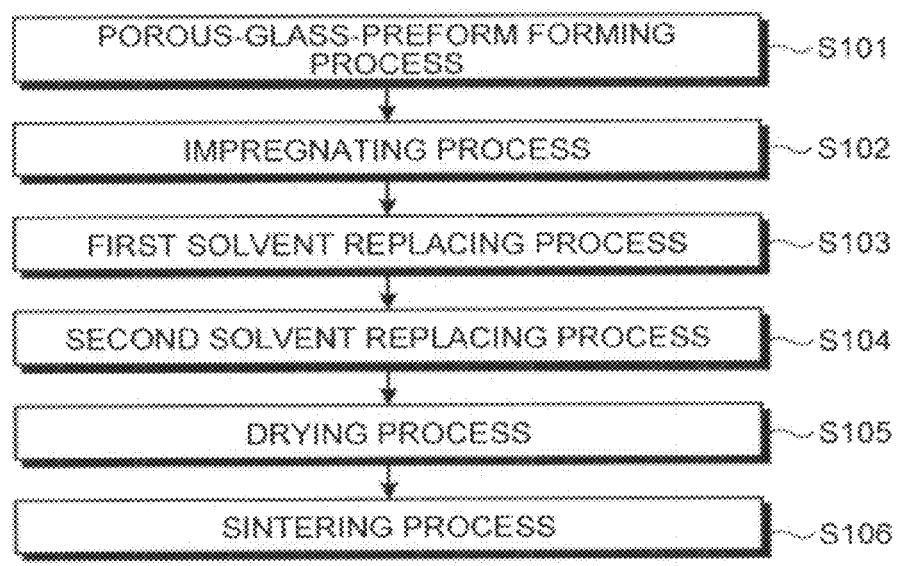
FIG. 1 is a flowchart of an optical fiber preform manufacturing method according to an embodiment of the present invention.

FIG. 1 is a flowchart of an optical fiber preform manufacturing method according to an embodiment of the present invention. As depicted in FIG. 1, in the optical fiber preform manufacturing method according to the present embodiment, a porous-glass-preform forming process is first performed (Step S101), an impregnating process is performed next (Step S102), a first solvent replacing process is performed (Step S103) next, a second solvent replacing process is performed next (Step S104), a drying process is performed next (Step S105), and lastly a sintering process is performed (Step S106). Each of the processes will be specifically explained below.

Figure 2:
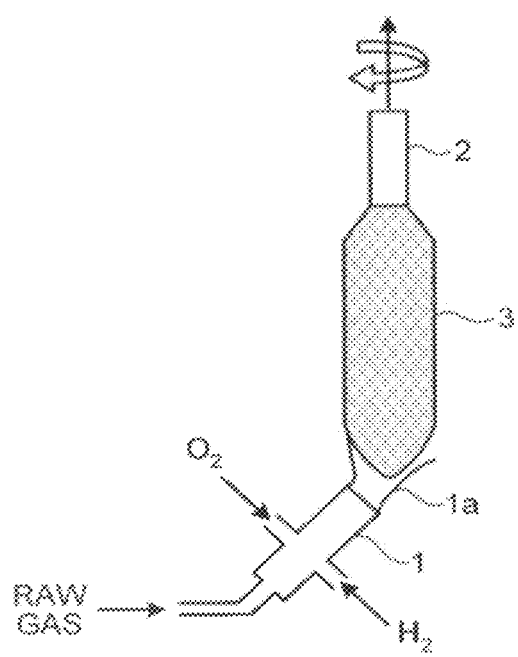
FIG. 2 is a schematic diagram for explaining a porous-glass-preform forming process using the VAD method.

First, the porous-glass-preform forming process at Step S101 is explained. FIG. 2 is a schematic diagram for explaining the porous-glass-preform forming process using. the VAD method. As depicted in FIG. 2, in the porous-glass-preform forming process, a source gas containing $SiCL_4$, $GeCl_4$, and $AlCl_3$, which are chloride gases of Si, Ge, and Al, which are materials of a porous glass preform, as well as $O_2$ gas and $H_2$ gas are supplied to a burner 1, and the source gas is hydrolyzed in an oxyhydrogen flame 1a to produce silica glass fine particles. By blowing the oxyhydrogen flame 1a to a lower end of a seed rod 2 made of silica glass that moves upward while being rotated around its axis, the silica glass fine particles produced are gradually deposited on the lower end of the seed rod 2. As a result, a porous glass preform 3 made of silica glass and having many fine pores inside is formed at the lower end of the seed rod 2. An average bulk density of the porous glass preform 3 formed is about 0.3 $g/cm^3$ to 0.8 $g/cm^3$.

Figure 3:
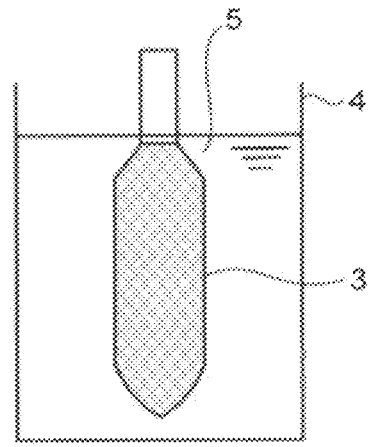
FIG. 3 is a schematic diagram for explaining an impregnating process.

The impregnating process at Step S102 is explained next. FIG. 3 is a schematic diagram for explaining the impregnating process. As depicted in FIG. 3, in the impregnating process, the porous glass preform 3 is immersed in an additive solution 5 stored in a vessel 4. The additive solution 5 has $ErCl_3.6H_2O$, which is a hydrate of a chloride of Er, dissolved in methanol, which is a solvent for the additive. A concentration of Er in the additive solution 5 is suitably selected according to a concentration of Er added in a glass preform to be finally manufactured, and is about 0.01 mol/L to 0.5 mol/L. The additive solution 5 is sufficiently impregnated into the porous glass preform 3.

Figure 4:
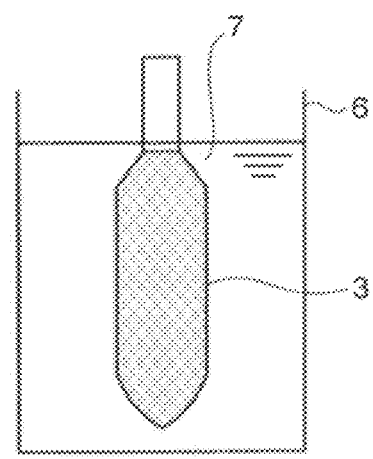
FIG. 4 is a schematic diagram for explaining a first solvent replacing process.

The first solvent replacing process at Step S103 is explained next. FIG. 4 is a schematic diagram for explaining the first solvent replacing process. As depicted in FIG. 4, in the first solvent replacing process, the porous glass preform 3 is immersed in a replacement solvent 7 stored in a vessel 6, in a state in which the additive solution 5 remains inside the porous glass preform 3, that is, in a wet state. The replacement solvent 7 is toluene. That is, the replacement solvent 7 is miscible with methanol, which is the solvent in the additive solution 5, and is able to be mixed in an arbitrary ratio. In the replacement solvent 7, a solubility of $ErCl_3.6H_2O$ is 0.0000023 g/ml at room temperature, which is considerably lower than 0.9 g/ml, which is a solubility of $ErCl_3$ in methanol.

As described above, because the replacement solvent 7 is miscible with methanol and a difference between the solubilities of $ErCl_3$ in the replacement solvent 7 and methanol is large, the following phenomena occur when the porous glass preform 3 is immersed in the replacement solvent 7 in the state in which the additive solution 5 remains inside the porous glass preform 3. The methanol in the porous glass preform 3 is quickly replaced with the replacement solvent 7 present in a large quantity in the vessel 6. On the other hand, $ErCl_3$ that has dissolved in the methanol in the porous glass preform 3 is deposited or precipitated due to the difference in its solubility with respect to the replaced replacement solvent 7, and the deposited or precipitated $ErCl_3$ remains in the porous glass preform 3 as it is. That is, because the $ErCl_3$ remains in high concentration in the porous glass preform 3 as a result of the deposition or precipitation of $ErCl_3$, much more Er is added into the porous glass preform 3, By continuing the immersion in the replacement solvent 7 for about a few days to sufficiently replace the methanol in the porous glass preform 3 with the replacement solvent 7, more Er is able to be added into the porous glass preform 3.

The second solvent replacing process at Step S104 is explained next. FIG. 5 is a schematic diagram for explaining the second solvent replacing process. As depicted in FIG. 5, in the second solvent replacing process, the porous glass preform 3 is immersed in a drying solvent 9 stored in a vessel 8 in a state in which the replacement solvent 7 remains inside the porous glass preform 3. The drying solvent 9 is n-hexane. That is, the drying solvent 9 is miscible with the replacement solvent 7, which is toluene. In the drying solvent 9, a solubility of $ErCl_3.6H_2O$ is considerably low at 0.0000018 g/ml at room temperature, and thus the $ErCl_3$ remains deposited or precipitated in the porous glass preform 3.

The drying process at Step S105 is explained next. FIG. 6 is a schematic diagram for explaining the drying process. As depicted in FIG. 6, in the drying process, the porous glass preform 3 after performing the second solvent replacing process is accommodated in a drying vessel 10, a temperature in the vessel 10 is increased to about 60° C. while flowing gas into the vessel 10, and this is maintained for, for example, a few days, to dry the porous glass preform 3.

In the drying process, the drying solvent 9 moves from the center toward the outer periphery of the porous glass preform 3, and the drying solvent 9 is evaporated from the outer periphery. However, because in the drying solvent 9, a solubility of $ErCl_3$ is considerably low, even if the drying solvent 9 moves, $ErCl_3$ does not move toward the outer periphery following the movement. When the porous glass preform 3 is dried immediately after the impregnating process, the additive solution 5 moves from the center toward the outer periphery of the porous glass preform 3 during drying, and following this movement, the dissolved $ErCl_3$ also moves toward the outer periphery. Therefore, an addition concentration of Er after the drying is distributed so as to be considerably low at the center and considerably high at the outer periphery. Consequently, Er is not able to be efficiently added to the center. On the contrary, if the first solvent replacing process is performed after the impregnating process like in the present embodiment, $ErCl_3$ is deposited or precipitated also at the center of the porous glass preform 3, and remains there without moving, and thus Er is able to be efficiently added into the center and uniform distribution of the addition concentration in the radial direction is achieved.

The drying solvent 9, n-hexane, to replac in the second solvent replacing process has a boiling point of 68.7° C., and is easier to be evaporated than the replacement solvent 7, toluene, having a boiling point of 110.63° C. Therefore, when the second solvent replacing process is performed between the first solvent replacing process and the drying process, the porous glass preform 3 is able to be dried faster in the drying process.

The sintering process at Step S106 is explained next. FIG. 7 is a schematic diagram for explaining the sintering process. As depicted in FIG. 7, in the sintering process, output of a heater 11 is adjusted such that a furnace temperature becomes 1500° C. to 1600° C. inside a sintering furnace equipped with the heater 11. Thereafter, as helium gas and chlorine gas are supplied into the sintering furnace, the porous glass preform 3 is moved down in the heater 11 while being rotated around the axis. By this sintering process, the porous glass preform 3 is transparently vitrified and becomes a transparent optical fiber preform 12 with the seed rod 2 attached as depicted in FIG. 8. As explained above, the optical fiber preform 12 manufactured according to the present embodiment is added with more Er in the light of the concentration of $ErCl:_3$ in the additive solution 5 than conventionally, and thus is efficiently added with Er.

In accordance with the above embodiment, a porous glass preform having an average bulk density of 0.42 $g/cm^3$ was formed using a source gas containing $SiCl_4$, $GeCl_4$, and $AlCl_3$. The porous glass preform was immersed in a methanol solution having a concentration of $ErCl_3.6H_2O$ of 0.095 mol/L, to perform the impregnating process. From this porous glass preform that has been subjected to the impregnating process, a specimen in the wet state, a specimen of Example 1, and a specimen of Comparative Example 1 were manufactured.

FIG. 9 is a schematic diagram for explaining a manufacturing method of Example 1 and Comparative Example 1. As depicted in FIG. 9, the porous glass preform 3 that has been subjected up to the impregnating process was cut in the wet state, and a disk-shaped part to be a wet specimen 32 having a thickness of about 5 millimeters was taken out from a position about 50 millimeters from a tip at an end opposite to the seed rod 2. A portion 31 at the tip end of the porous glass preform 3 was directly subjected to the drying process according to the above embodiment, and a disk-shaped part to be a specimen 34 of Comparative Example 1 having a thickness of about 5 millimeters was cut out from a position about 20 millimeters from the seed rod 2 end of the dried portion 31. A portion 33 at a seed rod 2 end of the porous glass preform 3 was subjected to the first solvent replacing process using toluene as the replacement solvent, to the second solvent replacing process using n-hexane as the drying solvent, and to the drying process, like in the above embodiment, and a part to be a specimen 35 of Example 1, having a thickness of about 5 millimeters, was cut out from a position of about 20 millimeters from an end opposite to the seed rod 2 of the dried portion 33.

Figures 10, 11:
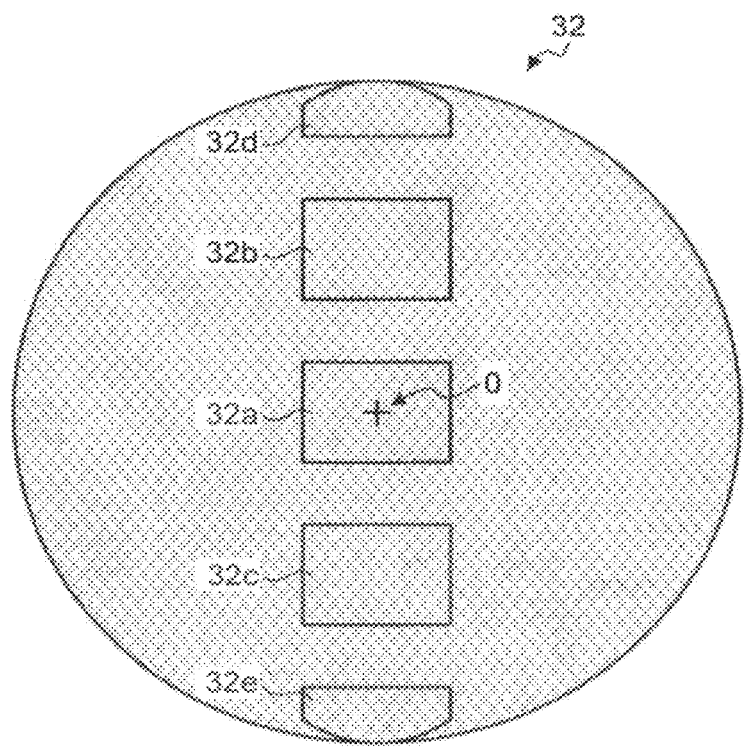
FIG. 10 is a schematic diagram for explaining cutout portions of a wet specimen as an example.
FIG. 11 is a table indicating percentage contents of Er in specimens of center portions, intermediate portions, and outer periphery portions of the wet specimen and the specimens of Comparative Example 1 and Example 1.

Next, strip portions were cut out from a center portion, outer periphery portions, and intermediate portions between the center portion and the outer periphery portions of each of the disk-shaped specimens 32, 34, and 35. FIG. 10 is a schematic diagram for explaining the cut-out portions of the wet specimen 32 as an example. As depicted in FIG. 10, a 10-mm square portion including a center point 0 of the specimen 32 was cut out as a specimen 32a of the center portion, 10-mm square portions at the intermediate portions between the center portion and the outer periphery portions were cut out as specimens 32b and 32c of the intermediate portions, and 5-mm-by-10-mm portions at the outer periphery portions were cut out as specimens 32d and 32e of the outer periphery portions. Each specimen was subjected to alkali-fusion and a percentage content of Er in each specimen was measured using inductively coupled plasma (ICP) optical emission spectroscopy.

FIG. 11 is a table indicating percentage contents of Er in the specimens of the center portions, intermediate portions, and outer periphery portions of the wet specimen and the specimens of Comparative Example 1 and Example 1. The unit is in percentage (mass fraction). As depicted in FIG. 11, the percentage content of Er at the center portion of the specimen of Comparative Example 1 was prominently decreased from that of the wet specimen, and the percentage content of Er at the outer periphery portion of the specimen of Comparative Example 1 was prominently increased from that of the wet specimen. On the contrary, the decrease in the percentage content of Er at the center portion of the specimen of Example 1 from that of the wet specimen was small. That is, it was confirmed that in Example 1, Er was able to added to the center portion more efficiently than in Comparative Example 1, even if the additive solutions with the same concentration of $ErCl_3$ were used. Further, the percentage contents of Er from the center portions to the outer periphery portion were more uniform in the specimen of Example 1.

The percentage content of Er at the outer periphery portion of the specimen of Example 1 was prominently smaller than that of Comparative Example 1. It was considered that this was because in the first solvent replacing process, methanol replaced by the replacement solvent was present around the porous glass preform and Er present at the outer periphery portion dissolved into that methanol.

By decreasing the percentage content of Er at the outer periphery portion, crystallization around Er nuclei at the outer periphery portion and generation of cracks after the sintering process are suppressible.

Specimens of Example 2 and Comparative Example 2 were manufactured similarly to Example 1 and Comparative Example 1 above. However, they differ in that a porous glass preform having an average bulk density of 0.45 g/cm$^3$ was used and in the impregnating process, a methanol solution, which was the additive solution, having a concentration of $ErCl_3.6H_2O$ of 0.050 mol/L (Example 2) or 0.67 mol/L (Comparative Example 2) was used. When percentage contents of Er in specimens at the center portions of the specimens of Example 2 and Comparative Example 2 were measured using the ICP optical emission spectroscopy, the result for the specimen of Comparative Example 2 was 0.079 (m/m). In contrast, for the specimen of Example 2, the result was 0.38% (m/m), and although the concentration of $ErCl_3$ in the methanol solution used was lower than that in Comparative Example 2, this percentage content was higher than that of Comparative Example 2.

In the above embodiment, although the second solvent replacing process is performed to complete the drying process quickly, the second solvent replacing process may be omitted.

Further, in the above embodiment, although a porous glass preform is formed using the VAD method, the OVD method may be used.

Further, in the above embodiment although Er is used as the additive, in the present invention, the additive is not particularly limited as far as it is able to be impregnated with a solution. For example, other rare earth metallic element such as Nd, Yb, Tm, Pr, or La; other transition metal; aluminum; or phosphorus; or any combination thereof may be used as the additive. When such an additive is desired to be added, a compound such as a chloride or an oxide of the desired additive may be dissolved in the additive solvent to manufacture an additive solution, and this may be used in the impregnating process.

Further, in the above embodiment, although methanol is used as the additive solvent, the solvent is not particularly limited as long as the solvent is able to dissolve the compound containing the desired additive. For example, water or other alcohol may be used as the additive solvent.

Further, although toluene is used as the replacement solvent in the above embodiment, the replacement solvent is not particularly limited as long as the solubility of the desired additive in the replacement solvent is lower than that in the additive solvent and the replacement solvent is miscible with the additive solvent. For example, xylene or other aromatic hydrocarbon may be used as the replacement solvent. To sufficiently cause the deposition or precipitation of the additive, an additive solubility ratio of the replacement solvent to the additive solvent is preferably 1/10, and more preferably 1/10000, and using a solvent in which the additive is hardly soluble or is insoluble is particularly preferable. When the replacement solvent contains water, Er may dissolve into the water contained in the replacement solvent. To infallibly prevent this, preferably the water containable in the replacement solvent is 1% or less and the replacement solvent is miscible with the additive solvent.

Further, although n-hexane is used as the drying solvent in the above embodiment, the drying solvent is not particularly limited as long as the solubility of a desired additive in the drying solvent is lower than that in the additive solvent, the drying solvent has miscibility with the replacement solvent, and the drying solvent has a boiling point lower than that of the replacement solvent. For example, other linear alkane may be used as the drying solvent. To infallibly prevent Er from dissolving into water contained in the drying solvent if the drying solvent contains the water, preferably water containable in the drying solvent is 1% or less and the drying solvent has miscibility with the replacement solvent.

According to an embodiment of the present invention, by immersing a porous glass reform in which an additive solution remains, into a replacement solvent, in which an additive has a solubility lower than that in an additive solvent, and which has miscibility with the additive solvent, and replacing the additive solvent remaining in the porous glass preform with the replacement solvent, it is possible for the additive to remain in higher concentration in the porous glass and thus an optical fiber preform added with the additive is efficiently manufacturable.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A method of manufacturing a glass preform, comprising:
   generating glass fine particles by hydrolyzing a source gas in an oxyhydrogen flame;
   depositing the generated glass fine particles to form a porous glass preform;
   immersing the porous glass preform in an additive solution including an additive solvent in which a compound containing a desired additive is dissolved to impregnate the additive solution into the porous glass preform;
   first replacing of replacing the additive solvent remaining in the porous glass preform with the replacement solvent by immersing the porous glass preform in which the additive solution remains in a replacement solvent in which a solubility of the additive is lower than that in the additive solvent and having miscibility with the additive solvent;
   drying the porous glass preform after the first replacing; and
   sintering the dried porous glass preform to transparently vitrify the dried porous glass perform, wherein the additive solvent is water or alcohol and the replacement solvent is toluene or xylene.

2. The method according to claim 1, wherein a ratio of a solubility of the additive in the replacement solvent to that in the additive solvent is $1/10$ or less.

3. The method according to claim 1, wherein the replacement solvent is a solvent in which the additive is insoluble.

4. The method according to claim 1, wherein the additive is a rare earth metal, a transition metal, aluminum, or phosphorus, or any combination thereof.

5. The method according to claim 1, further comprising, after the first replacing and before the drying, second replacing of replacing the replacement solvent remaining in the porous glass preform with the drying solvent by immersing the porous glass preform in which the replacement solvent remains, into a drying solvent in which a solubility of the additive is lower than that in the additive solvent, the drying solvent having miscibility with the replacement solvent and a boiling point lower than that of the replacement solvent.

* * * * *